Patented June 23, 1942

2,287,536

UNITED STATES PATENT OFFICE 2,287,536

UREA-PHENOL-FORMALDEHYDE ADHESIVE

Paul O. Powers, Lancaster, Pa., assignor to Armstrong Cork Company, Lancaster, Pa., a corporation of Pennsylvania No Drawing. Application June 8, 1939,
Serial No. 278,129

3 Claims. (Cl. 260—45)

This invention relates generally to adhesives and more particularly to such adhesives which comprise the condensation product of phenol, urea or its derivatives and aliphatic aldehydes, such for example as formaldehyde.

Although adhesives produced according to the present invention are suitable for a wide variety of purposes, they are particularly suited for cementing the glass applicator rods or droppers to bottle caps made of phenolic condensation products. Other uses of the adhesive are for joining metal foil discs to cork bottle stoppers, adhering glass to cork, wood to cork and metal to metal.

The adhesive of the present invention has been found to effectively join glass applicators to phenolic condensation product bottle caps. It has good adherence to the glass applicator and to the bottle cap. It cures or sets rapidly upon heating to a suitable temperature and shows no tendency to crack on drying. It sets at room temperature on standing for a time determined by the accelerator employed. It is water resistant, acid resistant and sets quickly enough on heating, so that it is eminently suited for various commercial applications.

The following is a specific example of one manner in which the adhesive may be produced, it being understood that the invention is not limited to the specific example which is given merely for illustrative purposes. 7½ pounds of crystalline urea, 7½ pounds of U. S. P. phenol and 3 gallons of 37% formalin are charged into a reaction vessel equipped with a stirrer and the pH or hydrogen ion concentration is adjusted by the addition of a dilute solution of sodium hydroxide or other suitable alkali. The pH value of the mixture is adjusted to about 5.5–7.0 and preferably to about 6.0–6.5. The temperature of the mixture is then raised to about 140–180° F., preferably about 160° F., and held at that temperature for about three hours. The temperature is then raised to the boiling point and water is evaporated until the temperature in the reaction vessel reaches about 240° F. The resin is then drained from the vessel and is ready for use.

When the resin is about to be used, it is mixed with an accelerator of condensation and then the mixed resin and accelerator are applied to the parts to be joined or treated. Where tartaric acid is employed as the accelerator, it is preferred to mix it with the resin in the ratio of 16 parts by weight of resin to one of accelerator. The accelerator preferably is a 50% solution by weight of tartaric acid in water. After the adhesive has been applied, it is set up by baking at a temperature of about 200–250° F. The resin will also cure at room temperature after several hours. Other acids such as hydrochloric or acetic may be used as accelerators. Hydrochloric acid is very fast, in fact too fast for most commercial uses. Acetic acid will effect a cure but the setting is very slow. In my adhesive, I prefer to use an acidic accelerator which produces a final pH of between 1 and 5, or more particularly between 2 and 4.

I have found that the proportions of phenol and urea in the reaction mixture are important for producing the best results. In the preferred mixture, the phenol constitutes approximately 50% of the total weight of phenol and urea. Where the proportion of phenol is too low, the condensation product does not have good water resistance and where it is too high, the setting properties of the mixed condensation products are too slow for many commercial applications. Although reasonably satisfactory results may be obtained where the phenol constitutes from 30 to 70% of the total weight of the phenol and urea, it is preferred in most applications to maintain the phenol in the proportion of 40–60% of the total weight of the phenol and urea. The preferred proportions are, as above stated, equal parts by weight of phenol and urea.

I have found that if the pH of the reaction mixture is substantially above the upper limit of the range previously given, namely 7.0, there is a definite tendency for the phenol-formaldehyde to cure out by itself rather than cure out together with the urea formaldehyde condensation product. Also the phenol aldehyde resin precipitates out and is no longer effective. On the other hand, if the pH of the reaction mixture is below 5.5, the urea formaldehyde tends to cure out, with the result that the adhesive is not sufficiently soluble in water. In order that the phenol and urea cure out simultaneously so as to produce a homogeneous product, it is important that the pH be closely controlled within the ranges specified.

An advantageous property of the adhesive produced according to the method above described is that it contains a relatively low percentage of water. The adhesive just prior to baking to cause it to set contains approximately 80% solids and 20% water. This low percentage of water obviates the tendency of the adhesive to crack upon setting. After the adhesive has set, it contains less than 20% of water.

Where the adhesive is to be used in cementing metal foil discs to cork stoppers, it is preferred to add about 20% of glycerine or an equivalent of other plasticizer to the resin before it is used. The glycerine may be added when the resin is made, and in such case some combination occurs.

The mixed phenol-urea-formaldehyde condensation product used as an adhesive is superior to phenol formaldehyde condensation products. The latter type of products tend to become water insoluble too quickly for their efficient manufacture and use. By the conjoint use of phenol and urea together with formaldehyde, the time during which the condensation product remains water soluble is materially increased and this facilitates the production and use of the adhesive.

An important characteristic of these adhesives is the fact that water may be eliminated by mere distillation, without resorting to vacuum or low temperature drying methods. An important characteristic of the potentially reactive resin is the unusually long shelf life, being from two to three months without harmful hardening, which is highly important in an adhesive used commercially and required to be made in large quantities and stored.

In place of urea, I may use thiourea or other urea derivatives. Although the preferred aldehyde is formaldehyde, I may use in its place other aliphatic aldehydes.

The invention is not limited to the preferred examples or the preferred proportions of ingredients but may be otherwise embodied or practiced within the scope of the following claims.

I claim:
1. The process of making an adhesive, which comprises adjusting to a pH of about 5.5 to 7.0 a mixture of urea, phenol and an aqueous solution of formaldehyde containing 37% formaldehyde, the phenol being in the proportion of about 40% to about 60% of the total weight of phenol and urea, heating the mixture at a temperature of about 140 degrees to 180 degrees F. for about three hours and then boiling the mixture until it contains about 20% water.

2. The process of making an adhesive, which comprises adjusting to a pH of about 6.0 to 6.5 a mixture of urea, phenol and an aqueous solution of formaldehyde containing 37% formaldehyde, the phenol being in the proportion of about 40% to about 60% of the total weight of phenol and urea, heating the mixture at a temperature of about 160° F. for about three hours and then boiling the mixture until it contains about 20% water.

3. The process of making an adhesive, which comprises adjusting to a pH of about 5.5 to 7.0 a mixture of a compound selected from the group consisting of urea and thiourea, phenol and an aqueous solution of formaldehyde containing 37% formaldehyde, the phenol being in the proportion of about 40% to about 60% of the total weight of phenol and said compound selected from the group consisting of urea and thiourea, heating the mixture at a temperature of about 140° to 180° F. for about three hours and then boiling the mixture until it contains about 20% water.

PAUL O. POWERS.